Nov. 2, 1948.  N. MARTINEZ  2,452,777
POWER TRANSMISSION
Filed Aug. 29, 1945  2 Sheets-Sheet 1
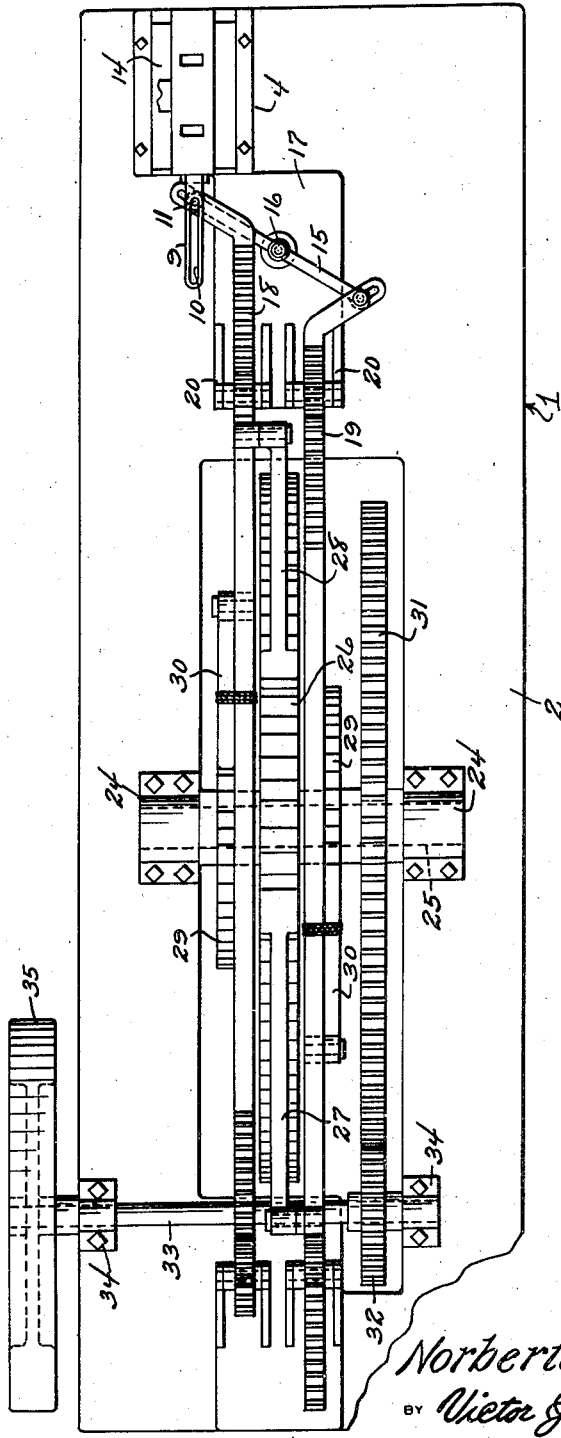
INVENTOR.
Norberto Martinez
BY Victor J. Evans & Co.
ATTORNEYS

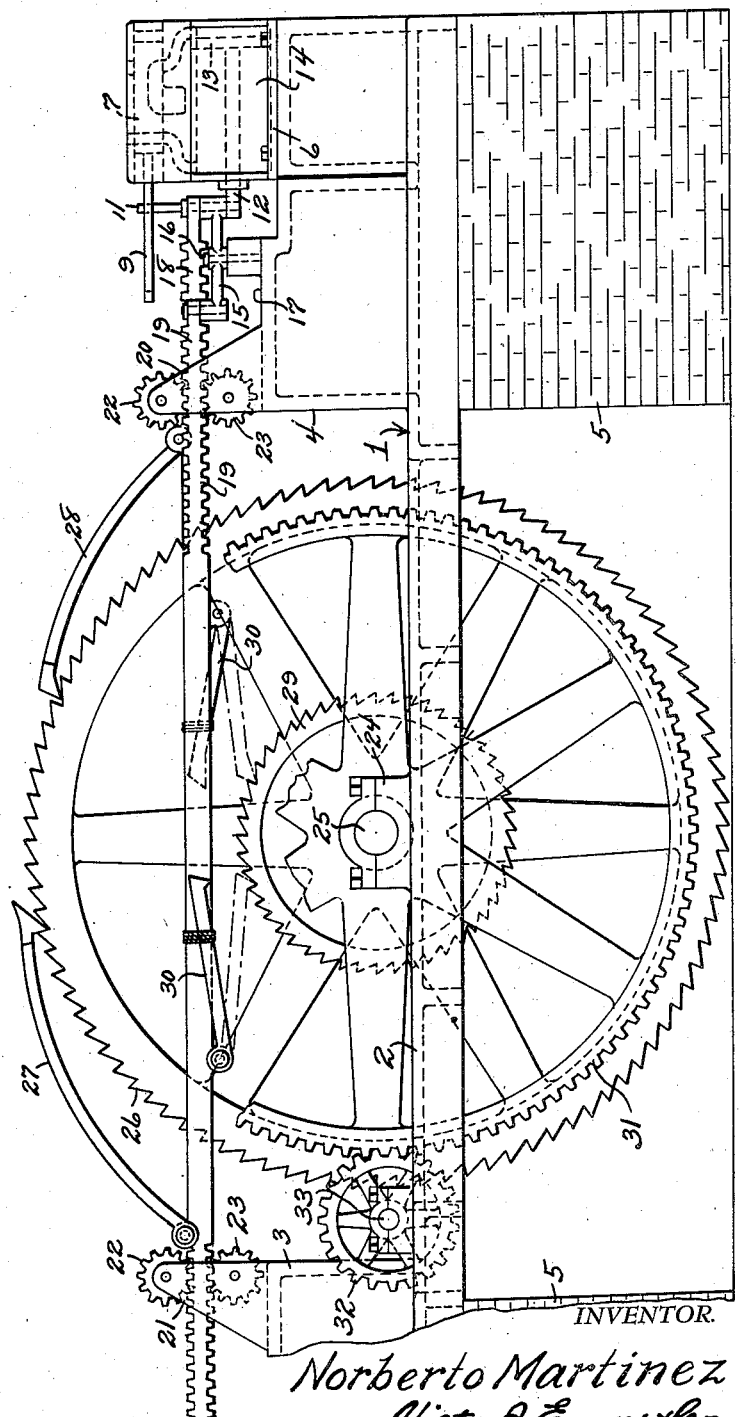

Patented Nov. 2, 1948

2,452,777

UNITED STATES PATENT OFFICE 2,452,777

POWER TRANSMISSION

Norberto Martinez, Somerville, Tex., assignor to Horace Gonzales, Chicago, Ill.

Application August 29, 1945, Serial No. 613,285

1 Claim. (Cl. 74—129)

My present invention, in its broad aspect, has to do with improvements in transmission devices for increasing the effective power of any motor, or other prime mover coupled with it, and the details of construction include reciprocating rack bars having pivoted toothed levers engaging a toothed driven wheel after the manner of an escapement to advance the driven wheel which is of relatively large diameter with a step-by-step motion caused by reciprocation of the rack bars by the prime mover through a reciprocating arm and a link connection with the bars to advance one bar while the other is retracted. The driven wheel is carried on a driven shaft on which is mounted a toothed wheel of lesser diameter than the driven wheel and meshing with a small gear on a fly wheel shaft from which the power is taken. Upper and lower gears support and steady the rack bars, and the transmission is mounted on a substantial foundation and base. My transmission is simple, sturdy, easy to install and operate, may be used with any source of power to transmit power for any purpose, and has no fragile or intricate parts likely to get out of order or to become deranged or broken.

Other and equally important objects and advantages of my invention will be apparent from the following description and drawings, and it is pointed out that changes in form, size, shape, materials, and construction and arrangement of parts are permissible and within the purview of my broad inventive concept, and the scope of the appended claim.

In the drawings, wherein I have illustrated a preferred form of my invention:

Figure 1 is a top plan view, and

Figure 2 is a side elevation.

In the drawings, wherein like characters of reference are used to designate like or similar parts throughout the several views:

The numeral 1 designates a base, having a platform 2, end supports 3 and 4, and mounted on spaced foundation piers 5 of masonry structure. Mounted on the end support 4 is a housing 6 carrying a slide valve 7 on supporting rails 8 for controlling the operation of a reciprocating engine. The slide valve 7 has an arm 9 with an elongated slot 10. In the slot is received a pin 11 on the rod 12 of a piston 13 in a cylinder 14 which may be an air or steam type of prime mover which may be coupled with my transmission. Reciprocation of the piston moves the valve through the arm to contact introduction of whatever power element is used. Also coupled with the pin 11 is a rocking lever 15 centrally pivoted, as at 16, on the plate 17. Also coupled with the pin 11 is the curved end of a horizontally disposed rack bar 18, and coupled with the opposite end of the rocking lever 15 is the oppositely curved end of another horizontal rack bar 19 parallel with and spaced from the bar 18. A pair of vertical spaced supports 20 are mounted on the plate 17 and another pair of spaced supports carries upper and lower gears 22 and 23 between which the rack bars reciprocate and are supported and steadied. Mounted in journals 24 on the platform 2 is a shaft 25 which carries ratchet toothed wheel 26 of relatively large diameter which is on each side of a curved arm 27 and 28 on each of the rack bars 18 and 19 so that as these bars are alternately reciprocated the wheel is rotated by the arms 27 and 28 with a rapid step-by-step movement, one rack bar is positioned on each side of the wheel, as shown in Figure 1. Also mounted on each side of the wheel on the shaft 25 are small auxiliary steadying ratchet wheels 29 engaged by dogs 30 on the under sides of the rack bars. Keyed to the shaft 25 is a large spoked gear wheel 31 which meshes with gear 32 on shaft 33 journaled in bearings 34 on the platform 2 on which is the balance wheel 35 which is the drive element of my transmission.

From the foregoing it is believed that the operation and advantages of my transmission will be apparent, but it is again emphasized that interpretation of the scope of my invention should only be conclusive when made in the light of the subjoined claim.

I claim:

A transmission device, comprising a driving shaft, a ratchet wheel secured thereto, a driving spur gear secured to said shaft and spaced axially from said ratchet wheel, a reciprocating bar on each side of said ratchet wheel, means supporting the bars for reciprocating movement, a pivotally mounted lever, a pin and slot means connecting each end of the lever with one of said bars whereby oscillatory movement of said lever causes reciprocation of the bars in directions opposite to each other, a prime mover for oscillating said lever, a pair of pawl members offset from said bars, said pawl members being in alignment with each other and operable in the plane of said ratchet wheel to engage the same for alternatively driving the same, means pivoting one of said pawl members to one of said bars for bodily movement therewith and engaging said ratchet wheel for moving the same in one direction, means pivoting the other of said pawl members to the other of said bars for bodily movement therewith and engaging said ratchet wheel for moving the same in said one direction, whereby said ratchet wheel is uni-directionally driven, a power take-off shaft, a spur pinion on said power take-off shaft and meshing with said driving spur gear.

NORBERTO MARTINEZ.

REFERENCES CITED

The following references are of record in the file of this patent:

UNITED STATES PATENTS

| Number | Name | Date |
|---|---|---|
| 355,986 | Gerlach | Jan. 11, 1887 |
| 452,085 | Sheen | May 12, 1891 |
| 547,121 | Kingsland et al. | Oct. 1, 1895 |
| 602,403 | Kunkel | Apr. 12, 1898 |
| 654,826 | Broadhead | July 31, 1900 |
| 791,366 | Rapp | May 30, 1905 |
| 800,732 | Forthun | Oct. 3, 1905 |
| 825,283 | Bezer | July 3, 1906 |
| 836,579 | Howard | Nov. 20, 1906 |

FOREIGN PATENTS

| Number | Country | Date |
|---|---|---|
| 351,216 | Italy | May 4, 1937 |